United States Patent Office 3,464,655
Patented Sept. 2, 1969

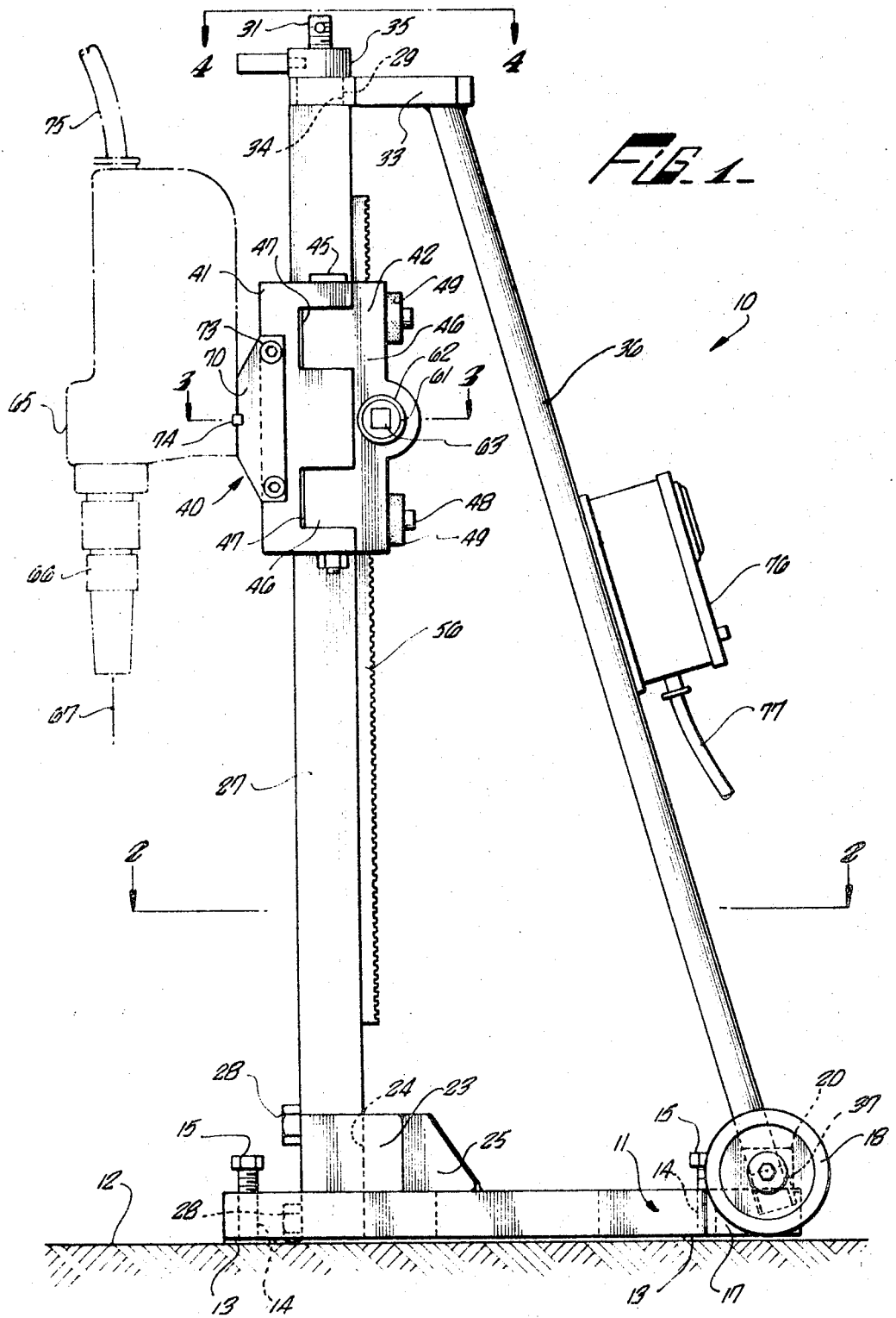

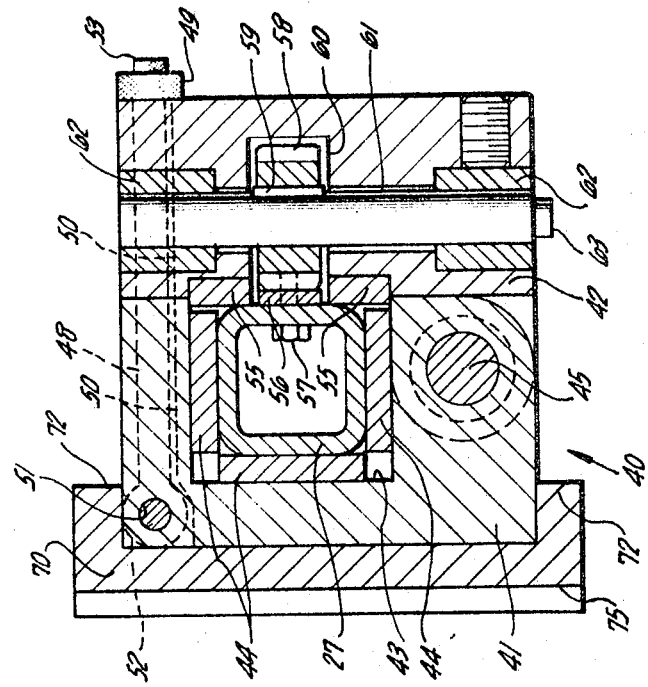

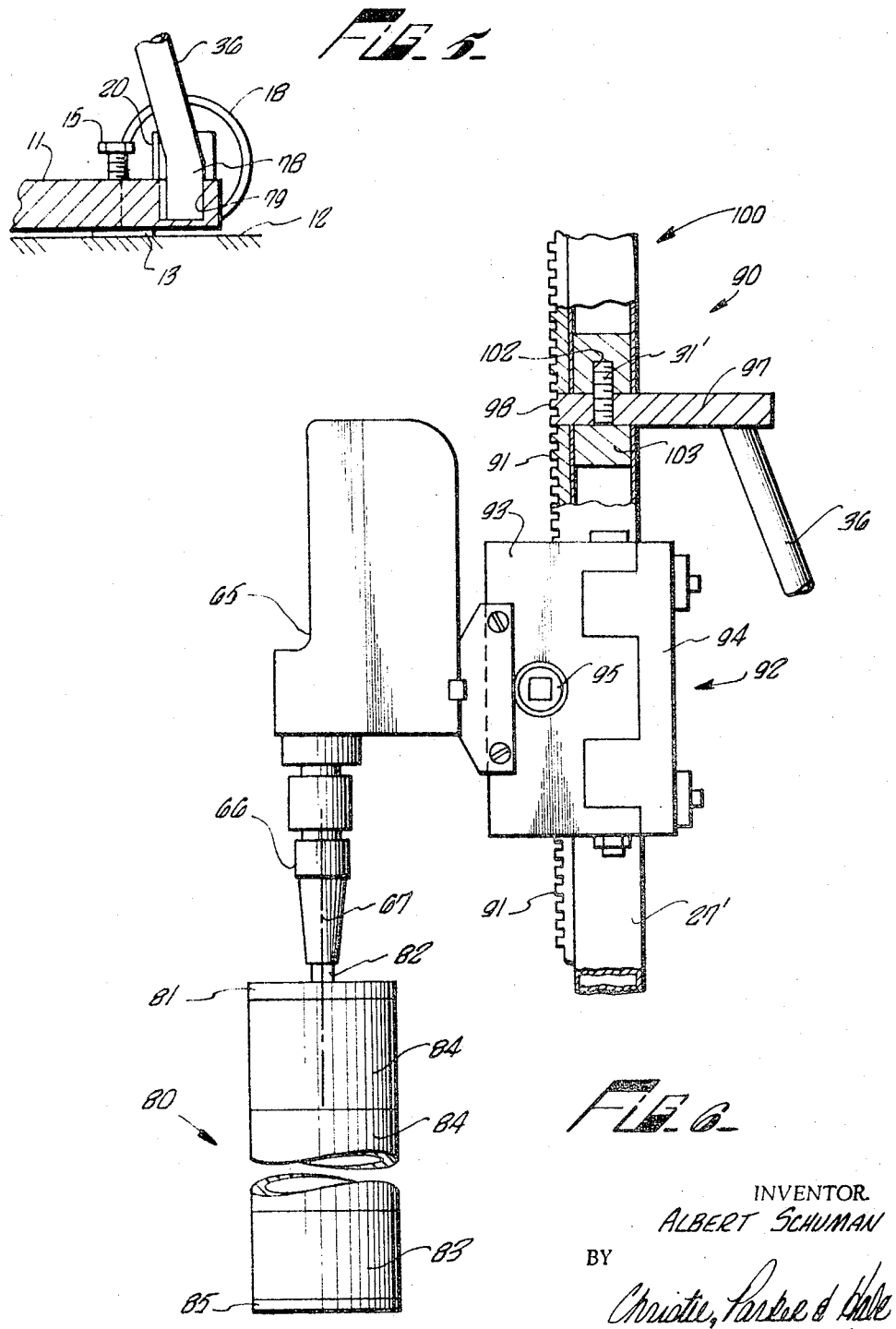

3,464,655
CONCRETE CORE DRILL
Albert Schuman, 19223 Alisal St.,
Covina, Calif. 91722
Filed Oct. 11, 1968, Ser. No. 766,734
Int. Cl. F16m *11/00;* E21c *5/00;* B23q *5/00*
U.S. Cl. 248—13       10 Claims

ABSTRACT OF THE DISCLOSURE

A concrete coring drill in which a drill motor, and a drill chuck connected to the motor, are moved linearly along a guide column supported at one end to a base and stayed at its other end to the base. A carriage is connected between the column and the motor for guiding the motor along the column and is readily openable relative to the column for rapid disconnection of the motor laterally from the column rather than over the end of the column following disconnection of the column stays.

BACKGROUND OF THE INVENTION

This invention relates to portable supports for moving a power drill in the direction of its drill axis. The invention is particularly well suited for use in drilling holes in concrete surfaces, rocks or walls.

The drilling of holes in concrete, as on construction sites, requires relative large and heavy drills which are difficult to manipulate manually. Holes formed by the use of manually guided drills usually are not round and straight. Frequently drill bits are broken because their drive motors are not steady during the drilling operation.

To eliminate the above-mentioned undesirable effects and conditions, supporting structures have been devised to hold and guide the drill motor during the drilling process. These structures generally provide a base for mounting the drill, together with the motor powering the drill bit itself, to the surface in which a hole is to be drilled. Conventionally, a post is mounted on the base, the drill being guided toward and away from the surface along the post. The end of the post spaced from the base is steadied by a variety of devices, such as tie bars and support plates which are connected between the base and the post. A carriage is slidably secured to the post for mounting the drill, and it is known to drive the carriage mechanically along the post as by a rack and pinion mechanism.

In prior devices put into practice, the drill guide carriages are removable from the post only by removing the tie bars or support plates, e.g., from the end of the post farthest from the base, and by slipping the carriage over that end of the post. Because the carriage support structure had to be at least partially dismantled, removal of the drill-mounting carriage in prior coring and drill devices was cumbersome and time-consuming.

An adequately strong and rigid drill support base of the type of interest is a heavy structure in itself. Substantial weight is added to the support base by the carriage and the drill. The heavier the complete device, the more difficult it is to handle. When a hole is to be drilled on a vertical surface such as a wall, on an overhead surface such as a ceiling or in inaccessible places, the carriage and the drill usually have to be removed from the base to enable an operator to attach the base to such surface. After the base has been attached to the desired surface, the carriage, together with the drill mounted to it, must be slipped over the post of the prior art device. The tie bar must then be secured to the post before the drilling operation can commence.

Particularly where a prior device is to be used high on a wall, the person attaching the carriage to the post has to reach back away from the wall (and away from a ladder or scaffold upon which the person may be standing) and guide the carriage and the drill motor onto the post. This procedure requires considerable physical effort and results in frequent accidents. These problems are especially acute where limited space is available and the operator has to work overhead.

Moreover, in practice, the carriages are frequently exchanged one for another in the substitution of one drill for another because each carriage is designed to mount a particular drill. Each time such a change is necessary, the tie bars, etc. must be removed from the guide posts of prior devices, the carriage removed axially from the post, and a new one inserted.

SUMMARY OF THE INVENTION

This invention provides a portable power drill which is especially well suited for drilling and coring in concrete surfaces. The drill is structured so that it can be used with ease on vertical and overhead surfaces and in difficult-to-reach locations. Drill motors can be interchanged on a support base with ease and rapidity. The support base provides a steady guide for the drill motor and a drill bit coupled to the motor. These advantages and features are provided in a structure which is rugged, economical and reliable.

Generally speaking, this invention provides a portable drill assembly for use in concrete drilling and coring. The drill assembly includes a base adapted to be supported on a surface to be drilled or cored. An elongate guide post has one of its opposite ends secured to the base. The guide post extends away from the base to its opposite end essentially normal to a surface upon which the base may be supported. Stay means are connected between the other end of the post and the base for bracing the post relative to the base. A carriage assembly is releasably engaged with the post for guided movement along the post. The carriage assembly is constructed so that it is removable from the post laterally of the post. The drill assembly also includes means for immovably yet releasably mounting to the carriage assembly a drive motor for a drill or a coring tool.

In the parlance of the art of concrete cutting, drilling involves the use of a solid rotary drill bit and coring involves the use of a cylindrical rotary saw having teeth or an abrasive cutting means at one end of the cylinder. Drilling and coring are both used to form circular holes in wall and floors. The practical difference, then, between drilling and coring turns basically upon the size of the hole desired, the size of the hole in turn determining whether a drill or a coring tool will be used.

DESCRIPTION OF THE DRAWINGS

The above-mentioned and other features and advantages of the invention are more fully set forth in the following detailed description of a presently preferred embodiment of the invention, which description is presented with reference to the accompanying drawings, wherein:

FIG. 1 is an elevation view of an improved concrete coring device;

FIG. 2 is a section view taken along line 2—2 of FIG. 1;

FIG. 3 is a section view taken along line 3—3 of FIG. 1;

FIG. 4 is a view taken along line 4—4 of FIG. 1;

FIG. 5 is a fragmentary cross-sectional elevation view of another coring device; and FIG. 6 is a fragmentary elevation view, partly in section, of another coring device according to this invention.

DESCRIPTION OF THE PREFERRED EMBODIMENT

A concrete drilling and coring machine 10 shown in FIG. 1 includes a rigid base plate 11 shown supported on a horizontal surface 12 in which a hole is to be formed. As shown in FIG. 2, base 11 has a generally rectangular planform configuration. Adjacent each of its corners a leveling pad 13 is secured to the underside of the base circumferentially of a threaded hole 14 formed through the base. A leveling bolt 15 cooperates with the base in each hole. The under surfaces of the leveling pads are disposed in a common plane. Accordingly, if the base of device 10 is disposed upon a perfectly flat surface in which a hole is to be drilled, the pads will all engage the surface; however, should the surface be non-planar, then leveling bolts 15 may be used to bring the base into four point stable engagement with the surface in which the hole is to be drilled.

To facilitate securing the base to a surface in which a hole is to be drilled, particularly a vertical or overhead surface, an elongate slot 16 is formed through the base as shown in FIG. 2. To secure the base to an appropriate surface a pair of bolts may be passed through the slot into engagement with suitable threaded sockets (not shown) secured within the surface in a manner familiar to those engaged in the business of drilling holes in concrete.

As shown in FIG. 2, adjacent rear corners of base 11 are notched at 17 to accommodate respective ones of a pair of wheels 18. Each wheel is mounted on an axle 19 supported in a block 20 welded to the upper side of the base adjacent the notch so that the wheels rotate about a common axis disposed transverse to the elongate extent of base 11. As shown in FIG. 1, the wheels are so positioned that they lie wholly above the plane defined by the under surfaces of leveling pads 13, and so that the rear extremities of the wheels lie rearwardly of the adjacent end of the base. Accordingly, device 10 may be moved from place to place by means of wheel 18, but at the site where a hole is to be drilled the base may be engaged with an appropriate surface without interference from the wheels.

As shown in FIG. 2, a V-shaped notch 22 is provided in the front edge of the base. A column step block 23 is secured to the upper side of the base adjacent the center of the notch and defines a vertically extending slot 24 which opens to recess 22. Reinforcing brackets 25 are welded between the base and the column step block to assure that the step block is immovably mounted to the base of device 10.

A tubular column 27, which preferably has a square or rectangular cross section, is mated snugly within slot 24 and is secured at its lower end to step block 23 by bolts 28. Column member 27 is of appropriate length and extends upwardly from base 11 along a line which preferably lies normal to the common plane defined by leveling pads 13. Within the upper end of the column member is secured a fitting which defines a short stub shaft 29 disposed concentric to the axis of the column member (see FIG. 4). The stub shaft has a diameter which is less than the minimum exterior transverse dimension of the column member so that the upper end of the column member itself defines an upwardly open shoulder 30 at the lower end of the stub shaft. An externally threaded stud 31 extends upwardly from the stub shaft coaxially of the column member.

A top plate 33, having formed therethrough an aperture 34 sized to mate snugly with the circumference of stub shaft 29 and having a thickness corresponding to the axial extent of the stub shaft, is engaged over the stub shaft to abut the shoulder 30. The top plate is clamped securely against the shoulder by a suitable nut or the like 35 engaged with threaded stud 31. The top plate extends rearwardly and horizontally from the upper end of the column member as shown in FIGS. 1 and 2. As shown in FIG. 4, it is preferred that the top plate front edge, and the side edges thereof adjacent the front edge, define upward extensions of the front and side edges of the column member. A pair of stay rods 36 for the column are secured between the rearward extension of the top plate and the rear portion of base 11. Preferably, the stay rods are welded between the top plate and the base, although the connection of the stay rods to the base may be by means of receiving sockets 37 within which the lower ends of the stay rods are secured by pins 38. Preferably the stay rods are fabricated of metal tubes. Alternatively, as shown in FIG. 5, the lower ends of the stay rods may be bent to define vertical terminal portions 78 which fit into slightly oversized vertical holes 79 formed in the base adjacent notches 17. In operation of the coring drill, the lower ends of the stay rods bear against the rear surfaces of the holes due to the loads imposed on the column by the reaction of the coring tool against the work surface.

It is preferred that base 11, column member 27, the top plate and the stay rods be fabricated of as lightweight material as possible consistent with the requirements for rigidity and structural strength associated with machines of the type described. It is also preferred that the stay rods diverge proceeding downwardly from top plate 33 to the base, thereby to provide as stable a support as possible for the column member.

In view of the construction described above, column member 27 is a component of a rigid and lightweight supporting and guide frame for a drill motor carriage 40 which is movable along the length of the column member. As shown in FIGS. 1 and 3, the carriage includes a slide member 41 and a door member 42. The slide member has substantial length along the column member and lies adjacent the front and side surfaces of the column member; this relation of the slide member to the column is provided by a rearwardly opening rectangularly configured slot 43 which extends vertically through the slide member, the column member being disposed within this slot. A replaceable wear plate 44 is secured to each vertical surface of slot 43 to engage the adjacent surface of the column member. Preferably the wear plates are fabricated of graphited bronze or the like. The wear plates are softer than the material of the column member so that as the carriage moves up and down the column during use of machine 10, plates 44 wear in preference to the exterior surfaces of the column member.

Door member 42 has a vertical extent corresponding to that of the slide member and is hingeably mounted to the slide member adjacent one side of the column member as shown in FIG. 3. The hingeable mounting of the door member to the slide member is effected by a hinge pin 45 which is carried within the slide member parallel to the elongate extent of slot 43. A pair of gudgeon lugs 46 (see FIG. 1) extend into cooperating recesses 47 formed within the slide member at spaced locations along the hinge pin, the gudgeon lugs journaling the hinge pin within these recesses. The door member is secured in closure relation to the slide member about column member 27 by a pair of locking bolts 48 which carry suitable knurled nuts 49, or the like. Each bolt 48 is disposed within a slot 50 which is defined within both the slide member and the door member along the extremity thereof opposite from hinge pin 43 and normal to the hinge pin. Each bolt 48 is secured to the slide member by a pin 51 which cooperates with an eye 52 formed at one end of the bolt. The opposite end of the bolt is threaded as at 53 to receive nut 49.

The door member carries a pair of wear plates 55, fabricated of material similar to that defining wear plates 44, which engage the rear exterior surface of the column member along the corners of the column member when the door member is closed relative to the slide member as shown in FIG. 3. Wear plates 44 and 55 cooperate with the exterior configuration of the slide member to cause carriage 40 to engage the column member in a relatively tight sliding fit.

A gear rack 56 extends along the major portion of the length of column 27 and is secured to the rear side of the column by bolts 57. In the closed position of door 42 relative to slide 41 the rack lies between the adjacent faces of wear plates 55 and cooperates with a drive pinion gear 58 secured, as by a key 59, to a shaft 61 which is rotatably mounted in the door by suitable journal bushings 62. The opposite ends of the pinion shaft extend exteriorly of the door member and are configured, as at 63, to resemble a square nut. Either projecting end of the pinion shaft may be engaged with any suitable wrench, or the like, to manually rotate the pinion shaft thereby to drive carriage 40 up or down along column member 27.

During use of machine 10, a suitable drill motor, such as air motor 65 having a suitable chuck 66 within which a concrete drill or coring tool may be engaged, is mounted to carriage 40 so that chuck 66 rotates about an axis 67 which is parallel to the axis of column member 27. Motor 65 may be mounted directly to the slide member of carriage 40 if desired, but it is preferred that the mounting of the motor to the carriage be by way of a motor support member 70 which is abutted with the forward face of the slide member and which has opposite vertical flanges 72 disposed adjacent the opposite side surfaces of the slide member. The motor support plate is releasably secured to the slide member as by machine screws 73 which cooperate between flanges 72 and suitable internally threaded holes formed in the slide member. The motor support plate and the motor are immovably connected together, as by way of horizontal key 74 engaged in a transverse keyway 75 in the motor support plate, and by suitable bolts (not shown) the heads of which are recessed into the surface of the support plate which engages the forward face of the slide member. The specific configuration of the motor support plate, as a practical matter, is dependent upon the specific motor which is used in machine 10 and, therefore, the details of construction of the support plate are considered to be within the talents of workers skilled in the art once the nature of the motor to be used is known. It is preferred, however, that each motor proposed for use in the machine be provided with its own support plate. Thus, when it is desired to interchange motors in the machine, it is a simple matter merely to disconnect the support plate from the carriage, to remove the motor and support plate as a unit, and to connect to the carriage the motor and support plate combination desired for use next in the machine.

Compressed air is supplied to motor 65 via hose 75 which is connected from the motor to a suitable pneumatic control device 76 mounted to stay rods 36. The control device may include a pressure dial and whatever control valves are desired to regulate the operation of motor 65. Compressed air is supplied to control device 76 via hose 77 from an appropriate compressor, or the like (not shown). It will be understood, however, that this invention is not restricted to the use of pneumatic motors, but that electric motors may be mounted to carriage 40 if desired. Pneumatic motors, however, are preferred since such motors generally are lighter in weight than electric motors of equal horsepower.

The use of machine 10 on a horizontal or substantially horizontal surface should be readily apparent from the content of the accompanying drawings. It is particularly where the machine is to be used on a vertical or overhead surface, such as a ceiling, that the advantages of machine 10 over prior devices become significant. Assume that a hole is to be cored through a reinforced concrete wall of an existing structure at some distance above floor level. At the time installation of machine 10 on the wall is commenced, carriage 40 is disconnected from column 27. The guiding and supporting frame for the carriage is bolted to the wall at such location that the axis of rotation of the motor to be used in the machine is coaxial with the desired axis of the hole to be formed. The mounting of base 11 and its associated structure to the wall is a relatively easy process and can be carried out quite rapidly in view of the light weight of this structure. Once the base has been properly mounted and secured to the wall, the operator then merely engages carriage 40 (to which motor 65 has been secured by a suitable motor support plate) to the column. The carriage is engaged with the column by opening door 42 relative to slide member 41 and by engaging wear plates 44 with the front and side surfaces of the column. The carriage door then is moved into closure relation with the slide member about hinge pin 45 so that wear plates 55 engage the rear surface of the column on the opposite sides of rack 56. The door is secured into closure relation with the carriage slide member by means of nut and bolt assemblies 48, 49. Preferably, this connection of carriage 40 to column 27 is made at a time when no coring tool is present in chuck 66. Accordingly, the initial connection of the carriage to the column can be effected to a location along the column which is close to base 11. This means that the operator, who may be standing on a ladder or a scaffold high above a floor, does not have to reach far back away from the wall to slide a carriage over an unsupported end of a guide column as is the case with prior drilling and coring devices. Also, it is not necessary for the operator to connect suitable stays to the unsupported end of the column member after a motor carriage has been slipped over the column. Instead, in machine 10 the carriage is engaged with the column in a convenient and safe manner at a location along the column which lies close to the wall and to the point of support of the operator on his ladder or scaffold.

After the carriage has been engaged with the column, the carriage may be run out from the wall and a suitable coring tool engaged in chuck 66. The device may then be operated by rotation of shaft 61 to drive the carriage toward the wall, or the like, as the coring operation is performed.

A typical coring tool 80 is shown in FIG. 6. The tool includes a base 81 having an axial shank 82 which is engageable in chuck 66. The tool base is threaded (not shown) to receive the cooperatively internally threaded upper end of either a core drill sleeve 83 or an extension sleeve 84 of suitable diameter. The lower end of the drill sleeve carries cutting abrasive 85 around its periphery. Where the hole to be cored is deeper than the length of drill sleeve 83, an appropriate number of extension sleeves are connected between base 81 and the drill sleeve to provide a coring tool of requisite length.

It is not at all uncommon that core drills is used to core holes of up to 20 feet or more in length. Prior core drills can be used to drill such holes. The drill motor is advanced along its supporting guide column toward the work surface in the manner described above, the motor initially being connected to a core drill which has a length less than the distance of motor travel afforded by the guide structure. When the hole has been drilled to such depth that the coring tool base is about to engage the work surface, operation of the motor is discontinued, the tool is broken apart below the base, and one or more extension sleeves are connected between the tool base and the drill sleeve to increase the effective length of the coring tool, after which process the coring operation is resumed; this process is repeated however many times it is necessary to build up a coring tool of length adequate to form a hole of the desired depth. Each time the tool is broken apart to enable the addition of extension sleeves to the coring tool, the drill sleeve and the extension sleeves connected thereto are supported in the hole with the end of the series of extension sleeves exposed above the work surface. In this way, prior coring devices and the coring devices of the present invention may be used to core holes having depths several times the distance of travel afforded by the drill guide structure.

As noted above, prior coring devices are so constructed that the drill motor carriages can be removed from the guide columns only over the ends of the columns, and only then after the stays for the columns have been removed from the columns. When the stays are removed from the guide columns of prior coring devices, rigid support for the drill motor is lost with the result that a long coring tool readily jams in the cored hole, thereby making it very difficult to remove the motor, and the coring tool connected to the motor, from the hole. For this reason, conventional tool removal practice with prior coring devices is not to unstay the guide column and to remove the coring tool piecemeal from the cored hole. That is, when the hole has been cored to the desired depth, the motor is retracted from the hole as far as possible, the tool is broken apart above the work surface, as many extension sleeves as possible are removed from the tool, the motor recoupled to the portion of the tool in the hole, and the process repeated until the tool is fully removed from the hole. Where the cored hole is substantially vertical, great care must be taken that the portion of the tool remaining in the hole not be allowed to fall back into the hole; such an occurrence can produce damage to the coring drill sleeve, but more importantly such an event requires that the lost tool portion be recovered before the tool removal process can be resumed. Instances are known, relative to prior coring devices, where it required only an hour or so to core a deep hole, but four hours were required to fish out of the hole a portion of the tool which was allowed to fall back into the hole during the above-described tool removal procedure.

Coring device 10 is so constructed that a long coring tool can be removed quite readily from a cored hole without resort to the cumbersome tool removal procedure described above. As noted above, the forward portion of top plate 33, as well as nut 35, lies within or defines upward extensions of the front and side walls of column member 27. To remove a long coring tool from a cored hole, the door of carriage 40 is opened to allow the carriage to be removed from the column by movement of the carriage axially of the column member without disconnection of stays 36 from the column. In the present coring device, the stays hold the column member in position relative to the cored hole so that the carriage, drill motor and coring tool can be removed as a unit from the cored hole, and during such removal wear plates 44 cooperate with the column member to assure movement of the tool along the axis of the cored hole.

Another coring device 90, shown in FIG. 6, may be used to advantage where the hole to be cored is extremely deep. Device 90 is similar to device 10 (FIG. 1), but in device 90 column 27' carries a rack 91 along its front surface rather than along its rear surface. Device 90 includes a carriage 92 which is similar to carriage 40 but in which a pinion gear (not shown) is mounted in a slide member 93 (rather than in door member 94) on a rotatable shaft 95. Also, relative to carriage 40 as illustrated in FIG. 3, the elements of carriage 92 corresponding to elements 44 and 55 are reversed in location. In all other material respects, carriage 92 is in accord with the illustration of FIG. 3.

Coring device 90 includes a column top plate 97 which is generally similar to column top plate 36, but which is constructed so that its front face defines an extension 98 of rack 91.

An extension 100 for column 27' is also provided. The extension is similar to column 27' and includes an end plug 101 drilled and tapped at 102 to cooperate with threaded shaft 31' which is defined by end fitting 103 of column 27'.

After a deep hole has been cored through the use of device 90, column extension 100 is connected to column 27', and the carriage is driven (by rotation of shaft 95) along the extended column, after door 94 is opened to clear top plate 97, to remove the coring tool from the hole. Because stays 36 remain coupled to the column, such movement of the carriage is along a line parallel to the axis of the cored hole and removal of the tool may be accomplished far more readily and expeditiously than was possible with prior coring devices.

The present invention has been described above with reference to a specific structural arrangement which illustrates a presently preferred embodiment of the invention. The foregoing description has been presented in furtherance of this presently preferred embodiment and is not intended to be an exhaustive catalogue of all forms which structure according to this invention may assume.

What is claimed is:

1. A portable drill assembly for use in concrete drilling and coring comprising a base adapted to be supported on a surface to be drilled, an elongate guide post having one end secured to the base to be fixed from angular movement relative to the base about the length of the post and extending away from the base to its other end along a line essentially normal to the base, post stay means connected between the base and the other end of the post for bracing the post from angular movement relative to the base about axes transverse to the length of the post, a carriage assembly releasably engaged with the post for guided movement along the post only parallel to the length of the post, the carriage assembly including quick-release latch means and being configured and arranged for removal from the post laterally of the elongate extent of the post, drive means cooperating between the post and the carriage assembly for driving the carriage assembly along the post toward and away from the base, the drive means being insensitive to the operational attitude of the drill assembly and being configured and arranged in cooperation with the carriage assembly for operation immediately upon engagement of the carriage assembly with the post, and means for immovably yet releasably securing a tool drive motor having a rotatable shaft to the carriage assembly in such manner that the motor shaft is constrained to be disposed parallel to the length of the guide post.

2. Apparatus according to claim 1 wherein the means for driving the carriage assembly comprising a gear rack extending along the guide post and a gear rotatably mounted to the carriage assembly for engagement with the rack.

3. Apparatus according to claim 1 wherein the guide post has a non-circular cross-sectional configuration in planes normal to its elongate extent.

4. Apparatus according to claim 1 including means for securely mounting the base to vertical and overhead surfaces to be drilled.

5. Apparatus according to claim 1 wherein the stay means are essentially permanently connected between the guide post and the base.

6. A portable drill assembly for use in concrete drilling and coring comprising:
 (a) a base adapted to be supported on a surface to be drilled,
 (b) an elongate guide post having one end secured to the base and extending away from the base to its other end along a line essentially normal to the base, (c) post stay means connected between the base and the other end of the post for bracing the post relative to the base, (d) a carriage assembly releasably engaged with the post for guided movement along the post only parallel to the length of the post, the carriage assembly being configured and arranged for removal from the post laterally of the elongate extent of the post and including
  (1) a slide member arranged for slidable engagement with a portion of the circumference of the guide post,
  (2) a door member hinged to the slide member and arranged to slidably engage at least a portion of the remainder of the circumference of the guide post when disposed in post engaging closure relation to the slide member, and
  (3) means for releasably securing the door member in closure relation to the slide member, (e) drive means cooperating between the post and the carriage assembly for driving the carriage assembly along the post toward and away from the base, the drive means being insensitive to the operational attitude of the drill assembly and being configured and arranged in cooperation with the carriage assembly for operation immediately upon engagement of the carriage assembly with the post, and (f) means for immovably yet releasably securing a tool drive motor to the carriage assembly.

7. Apparatus according to claim 6 including replaceable wear means carried by the carriage assembly for sliding engagement with the guide post, the wear means wearing in preference to the guide post.

8. A portable drill assembly for use in concrete drilling and coring comprising:

(a) a base adapted to be supported on a surface to be drilled, (b) an elongate guide post of non-circular cross-sectional configuration in planes normal to the elongate extent thereof having one end secured to the base and extending away from the base to its other end along a line essentially normal to the base, (c) a carriage assembly releasably engaged with the post for guided movement along the post only parallel to the length of the post, the carriage assembly being configured and arranged for removal from the post laterally of the elongate extent of the post, (d) drive means cooperating between the post and the carriage assembly for driving the carriage assembly along the post toward and away from the base and comprising a rack extending along the guide post and a gear rotatably mounted to the carriage assembly for engagement with the rack, the gear being disposed for cooperation with the rack essentially immediately upon engagement of the carriage assembly with the post, (e) post stay means essentially permanently connected between the base and the other end of the post for bracing the post relative to the base, (f) post stay coupling means coupling the stay means to the other end of the post and having boundary surfaces either defining or lying within extensions of the corresponding surfaces of the post around a major portion of the periphery thereof, the post stay coupling means defining a continuation of the rack, (g) a post extension engageable with the other end of the post via the stay coupling means and defining a further extension of the rack, and (h) means for immovably yet releasably securing a tool drive motor to the carriage assembly.

9. A portable drill assembly for use in concrete drilling and coring comprising:

(a) a base adapted to be supported on a surface to be drilled, (b) an elongate guide post having one end secured to the base and extending away from the base to its other end along a line essentially normal to the base, (c) a carriage assembly releasably engaged with the post for guided movement along the post only parallel to the length of the post, the carriage assembly being configured and arranged for removal from the post laterally of the elongate extent of the post and including a slide member arranged for slidable engagement with a major portion of the circumference of the post and door means releasably engageable with the slide member around the remainder of the circumference of the post for holding the slide member in slidable engagement with the post, (d) drive means cooperating between the post and the carriage assembly for driving the carriage assembly along the post toward and away from the base, the drive means including a rack carried by the post and a gear mounted to the carriage assembly, the drive means being arranged for operation essentially immediately upon engagement of the carriage assembly with the post, (e) post stay means essentially permanently connected between the base and the other end of the post for bracing the post relative to the base and including coupling means at the other end of the post defining an extension of the rack and arranged to enable driven guided movement of the slide member therepast upon opening of the door means relative to the slide member, (f) post extension means engageable with the post at the other end thereof and defining a further extension of the rack, and (g) means for immovably yet releasably securing a tool drive motor to the carriage assembly.

10. A portable drill assembly for use in concrete drilling and coring comprising:

(a) a base adapted to be supported on a surface to be drilled, (b) an elongate straight guide post having one end secured to the base and extending away from the base to its other end which is spaced from the base, (c) a carriage assembly releasably engaged with the post for guided movement along the post only parallel to the length of the post, the carriage assembly being configured and arranged for quick removal from the post laterally of the elongate extent of the post and including
  (1) a slide member arranged for slidable engagement with a portion of the circumference of the guide post,
  (2) a door member hinged to the slide member and arranged to slidably engage at least a portion of the remainder of the circumference of the guide post when disposed in post engaging closure relation to the slide member, and
  (3) quick-release latch means for releasably securing the door member in closure relation to the slide member, (d) drive means cooperating between the post and the carriage assembly for driving the carriage assembly along the post toward and away from the base, the drive means being insensitive to the operational attitude of the drill assembly, being configured and arranged in cooperation with the carriage assembly for operation immediately upon engagement of the carriage assembly with the post, and including a rack mounted to the post and extending along the length thereof and a gear rotatably mounted in the carriage assembly for cooperation with the rack upon engagement of the carriage assembly with the post, and (e) means for immovably yet releasably securing a tool drive motor to the carriage assembly.

References Cited

UNITED STATES PATENTS

| | | | |
|---|---|---|---|
| 340,251 | 4/1886 | Saunders | 248—13 |
| 365,733 | 6/1887 | Cullingworth | 248—13 |
| 934,102 | 9/1909 | Smith | 248—13 |
| 1,747,869 | 2/1930 | Hansen | 248—125 X |
| 2,575,097 | 11/1951 | Cole | 248—125 X |
| 2,991,966 | 7/1961 | Varel | 248—125 |

ROY D. FRAZIER, Primary Examiner

J. FRANKLIN FOSS, Assistant Examiner

U.S. Cl. X.R.

248—125; 173—148; 74—89.17, 842